(12) United States Patent
Shapira et al.

(10) Patent No.: US 6,987,990 B2
(45) Date of Patent: Jan. 17, 2006

(54) CELLULAR BASE STATION AUGMENTATION SYSTEM AND METHOD

(75) Inventors: Joseph Shapira, Haifa (IL); Paul H Lemson, Woodinville, WA (US); David Levy, Carmiel (IL)

(73) Assignee: Celletra Ltd., Yokneam Ilit (IL)

( * ) Notice: Subject to any disclaimer, the term of this patent is extended or adjusted under 35 U.S.C. 154(b) by 322 days.

(21) Appl. No.: 10/181,272

(22) PCT Filed: Jan. 26, 2001

(86) PCT No.: PCT/US01/02477

§ 371 (c)(1),
(2), (4) Date: Dec. 27, 2002

(87) PCT Pub. No.: WO01/56193

PCT Pub. Date: Aug. 2, 2001

(65) Prior Publication Data

US 2003/0109283 A1    Jun. 12, 2003

Related U.S. Application Data

(60) Provisional application No. 60/177,653, filed on Jan. 27, 2000.

(51) Int. Cl.
*H04M 1/00* (2006.01)
*H04B 1/02* (2006.01)
*H01Q 3/22* (2006.01)

(52) U.S. Cl. .................. 455/562.1; 455/561; 455/101; 342/375

(58) Field of Classification Search ................. 455/78, 455/82–83, 88, 561, 562.1, 101, 13.3, 272, 455/277.1–277.2; 375/299, 347; 342/368, 342/375
See application file for complete search history.

(56) References Cited

U.S. PATENT DOCUMENTS

| 4,520,476 A | 5/1985 | Searl |
| 5,329,548 A | 7/1994 | Borg |
| 5,714,957 A | 2/1998 | Searle et al. |
| 5,923,303 A | 7/1999 | Schwengler et al. |
| 5,970,061 A * | 10/1999 | Kokudo ...................... 370/344 |
| 6,256,356 B1 * | 7/2001 | Suzuki ....................... 375/260 |
| 6,275,484 B1 * | 8/2001 | Lynch et al. ................. 370/342 |
| 6,347,234 B1 * | 2/2002 | Scherzer ................... 455/562.1 |
| 6,411,824 B1 * | 6/2002 | Eidson ......................... 455/561 |
| 6,658,269 B1 * | 12/2003 | Golemon et al. ........... 455/101 |

FOREIGN PATENT DOCUMENTS

EP    766 414    4/1997

(Continued)

OTHER PUBLICATIONS

Patent Abstracts of Japan; vol. 1999, No. 04, Apr. 30, 1999 & JP 11 027196 A, (Kokusai Electric Co Ltd.; NTT IDO Tsushinmo KK), Jan. 29, 1999, abstract.

(Continued)

*Primary Examiner*—Lee Nguyen
*Assistant Examiner*—Wen Huang

(57) ABSTRACT

A method and apparatus for augmenting an existing base station for cellular communications, especially when the existing base station includes a main antenna and a diversity antenna. The method comprising replacing the diversity antenna array with a new diversity antenna array comprising both receive and transmit elements; installing a switching matrix in the signal path between the base station and the transmit element of both the new diversity antenna array and the main antenna array; and switching the transmission of data between the transmit elements of the main antenna array and the diversity antenna array.

14 Claims, 10 Drawing Sheets

FOREIGN PATENT DOCUMENTS

| | | |
|---|---|---|
| GB | 2 290 006 | 12/1995 |
| GB | 2 323 750 | 9/1998 |
| WO | WO9744983 | 11/1997 |
| WO | WO9811626 | 3/1998 |
| WO | WO9839851 | 9/1998 |

OTHER PUBLICATIONS

Sabharwal et al: "Sector Beam Synthesis for Cellular Systems using Phased Antenna Arrays"; IEEE Transactions of Vehicular Technology, vol. XX, No. Y, Month 2000, pp. 100-106.

* cited by examiner

CELLULAR BASE STATION AUGMENTATION SYSTEM AND METHOD

RELATED APPLICATION DATA

Priority is hereby claimed to U.S. Provisional Patent Application Ser. No. 60/177,653, entitled Cellular Base Station Augmentation and Method, filed Jan. 27, 2000, the content of which is hereby expressly incorporated by reference herein, in its entirety.

BACKGROUND OF THE INVENTION

1. Reservation of Copyright

This patent document contains information subject to copyright protection. The copyright owner has no objection to the facsimile reproduction by anyone of the patent document or the patent, as it appears in the U.S. Patent and Trademark Office patent files or records, but otherwise reserves all copyright rights whatsoever.

2. Field of the Invention

The present invention, in certain aspects, relates to wireless communication systems. In other aspects, the present invention relates to augmenting the capabilities of existing base station antenna systems.

DESCRIPTION OF BACKGROUND INFORMATION

Existing and operational base stations for cellular and Personal Communication Systems (PCS) typically comprise antenna arrangements that may include a first (main) antenna array of collocated antenna elements and a second (diversity) antenna array or an individual antenna element located at a distance from the first antenna array. The main antenna array of these systems has antenna elements that serve as both transmit and receive antennas. The diversity antenna arrays of these systems have only receiving antenna elements. Either or both the main antenna array and the diversity antenna array may be passive, since the antenna elements are not coupled to proximate amplifiers provided near the main antenna array or the diversity antenna array.

There is a need to augment existing base station antenna setups such as these, particularly when they are located at a remote location some distance from the RF portion of the base station equipment, such as when the antenna setups are located at the top of a mast or a building. For example, existing and operational base stations would benefit by rendering their receive antenna elements active, that is, by installing low noise amplifiers (LNA) at the top of the mast or building, rather than exclusively at the bottom of the mast or building. This would provide advantages, including greater base station range due to enhanced receiver sensitivity, and would reduce the cabling and power consumption costs associated with carrying signals up and down the mast or building. Base station antenna setups may also need augmentation or modification to facilitate a change in cellular technologies, for example, adding Code Division Multiple Access (CDMA) capabilities to a base station that uses the Advanced Mobile Phone System (AMPS) or Global System for Mobile Communication (GSM) standard, or changing the base station altogether for use with a different air interface technology, for example, CDMA.

There is also a need to add antenna functionality, for example, to accommodate new cellular technologies and enhance performance over the forward and reverse links without adding antenna arrays. Extra antenna arrays may take up additional space, or may be unacceptable (and may also be a violation of local laws, regulations or ordinances).

SUMMARY OF THE INVENTION

The present invention is provided to improve wireless communications systems. More specifically, the present invention is provided to facilitate the augmentation of cellular base station systems, for example, improving the transmit and receive performance of a given base station and its associated cell or sector, or providing new cellular technology (for example, CDMA) capabilities to an existing base station.

The present invention, therefore, is directed to a system and method or one or more components thereof In accordance with such a method or system, an existing and operational base station serving a given cell or sector has a main antenna array and a passive (space) diversity array. The passive diversity antenna array of the existing base station is replaced with an active antenna array. The active antenna array includes an array of both receive and transmit antenna elements, that are connected (at the mast-head, or at the top of the building) to transmit and receive amplifiers and bandpass filters. The active antenna array may be similar in physical size to the passive diversity array.

The receive antenna elements of the active antenna array may comprise sets of receive antenna elements having diverse polarization, in which case the resulting modified antenna arrangement will have dual diversity for reverse link communications, i.e. space diversity (due to the spacing between the main antenna array and the new active antenna array), and polarization diversity (due to the polarization diversity among members of the sets of receive antenna elements within the active antenna array).

The existing and operational antenna arrangement may be for a CDMA cellular system, having no diversity on the forward link (base station to mobile) along with space diversity on the reverse link (mobile to base station). Once the diversity antenna array, which comprises receive antenna elements, is replaced with an active antenna element array that comprises transmit as well as receive antenna elements, the resulting antenna assembly will have transmit diversity (space diversity) capabilities. In addition, there will be a gain in effective isotropic radiated power (EIRP) over the forward link because the transmit antenna elements are now provided with power amplifiers, for example, at the mast head or building top.

The existing and operational base station of the present invention may be configured for the AMPS or GSM standard, while the replacement of the space diversity receive antenna element array results in an antenna arrangement that can accommodate a new cellular communications scheme (for example, CDMA) in addition to the existing scheme (for example, AMPS or GSM) or in replacement of the existing scheme. Where the old scheme and the new scheme coexist for a given base station (for example, as a result of replacing a passive receive antenna array with an active transmit/receive antenna array), the active diversity array can serve as the transmit and receive elements that serve the new scheme, while the main array would continue to serve the old scheme.

Using dual transmission at both space-diversity antennas can also be beneficial for operators who wish to double the total number of served carriers without having to replace the power amplifier unit. By dividing the served carriers into two groups, with each group containing half the number of carriers having a relatively small frequency spacing, and directing each group to another active antenna array, a simpler and lower cost power amplifier can be used.

The augmentation can further be extended for Time Division Multiple Access (TDMA) systems, such as GSM and IS-136 by adding a switch between the RF front-end active antenna array and the channel cards. This configuration will provide some forward link performance benefit for TDMA systems, similar to time-diversity on CDMA.

The features, objects, and advantages of the present invention will become more apparent from the detailed description set forth below when taken in conjunction with the drawings. FIGS. 1–14 show various example embodiments of the present invention.

BRIEF DESCRIPTION OF THE FIGURES

The present invention is further described in the detailed description which follows by reference to the noted drawings by way of non-limiting exemplary embodiments, in which like reference numerals represent similar parts throughout the several views of the drawings, and wherein.

DETAILED DESCRIPTION OF THE EMBODIMENTS

Figure 1:
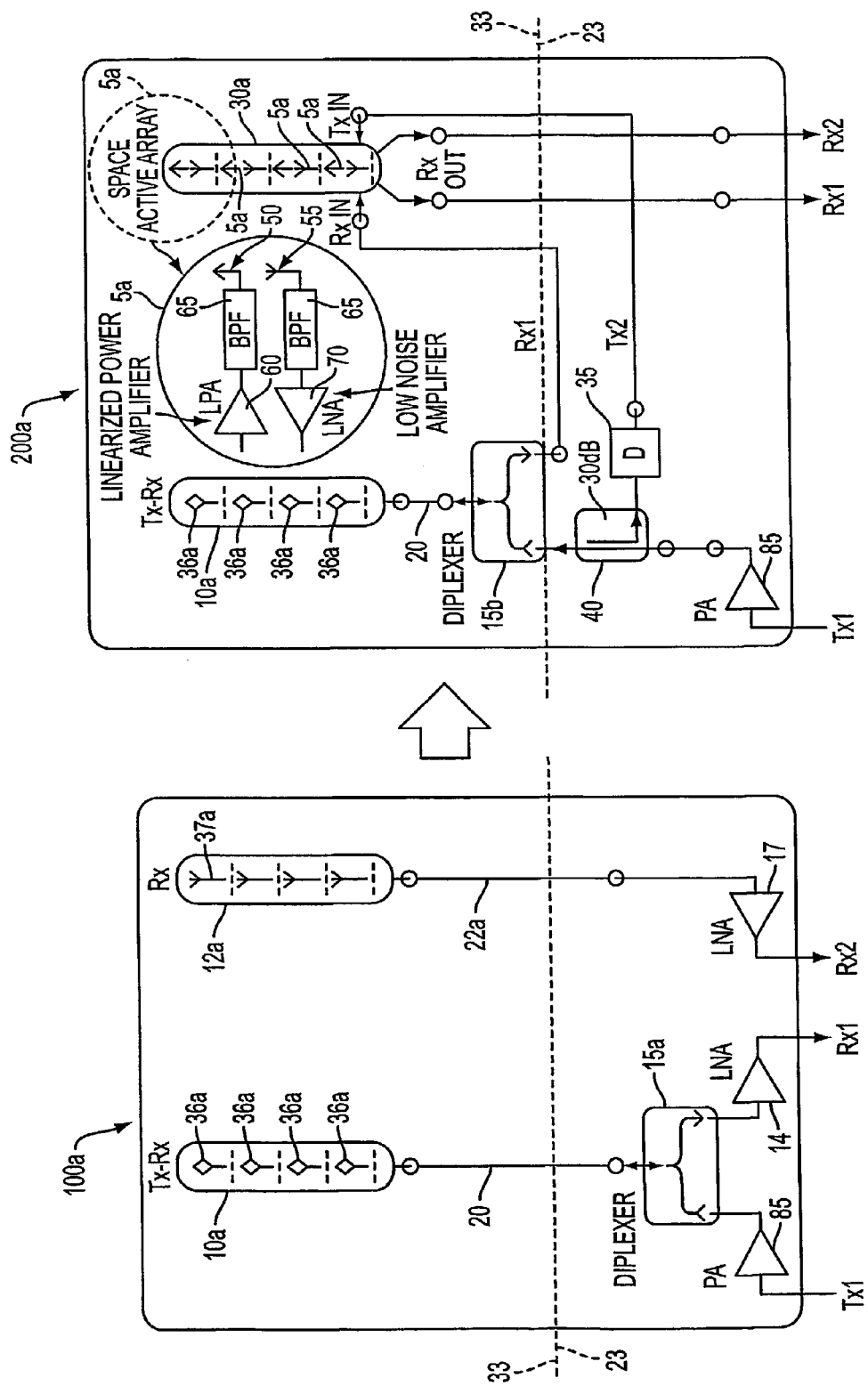
FIG. 1 illustrates the augmentation of a space diversity base transceiver system (BTS) to transmit (Tx) time diversity with one active array (CDMA application)
Figure 2:
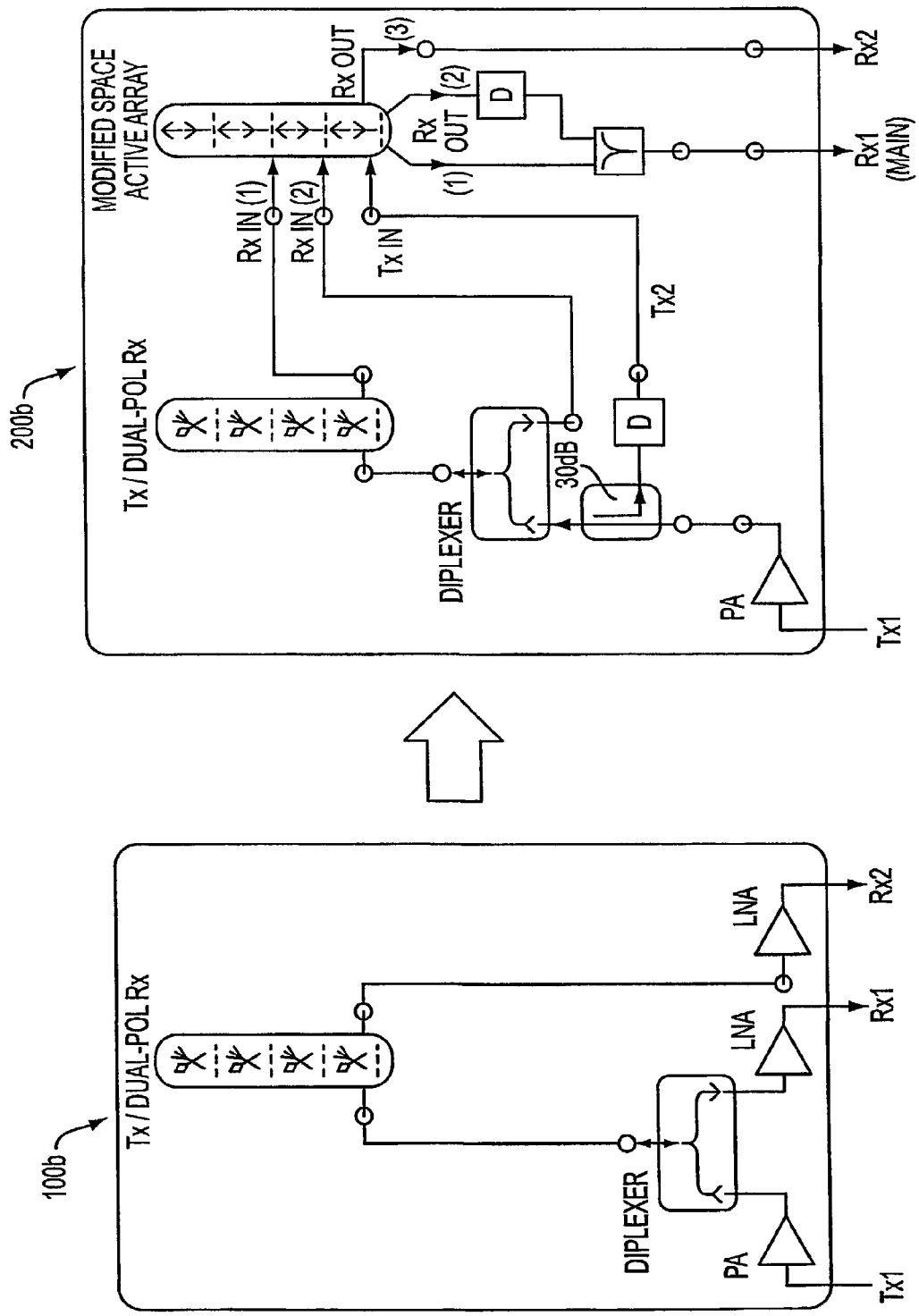
FIG. 2 illustrates the augmentation of a polarization diversity BTS to Tx time diversity (CDMA application)
Figure 3:
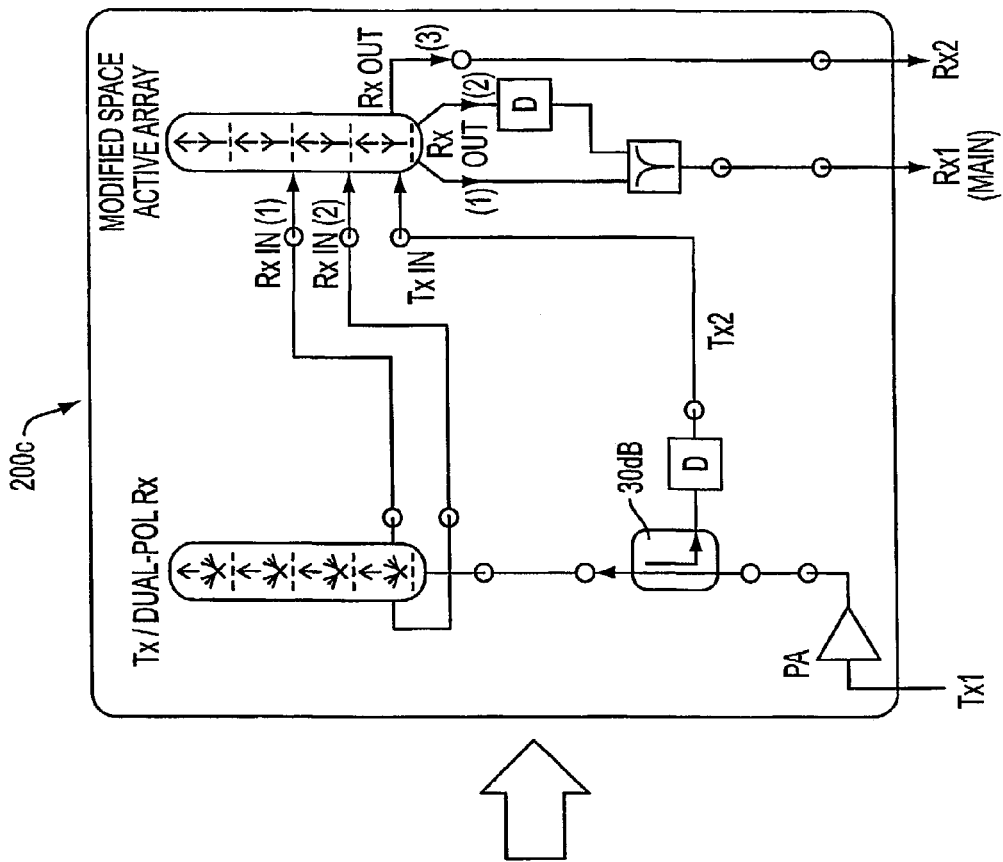
FIG. 3 illustrates the addition of Tx and receive (Rx) time diversity to an original Rx Polarization Diversity configuration having no Tx diversity and a separate Tx-Rx antenna (CDMA application)
Figure 3:
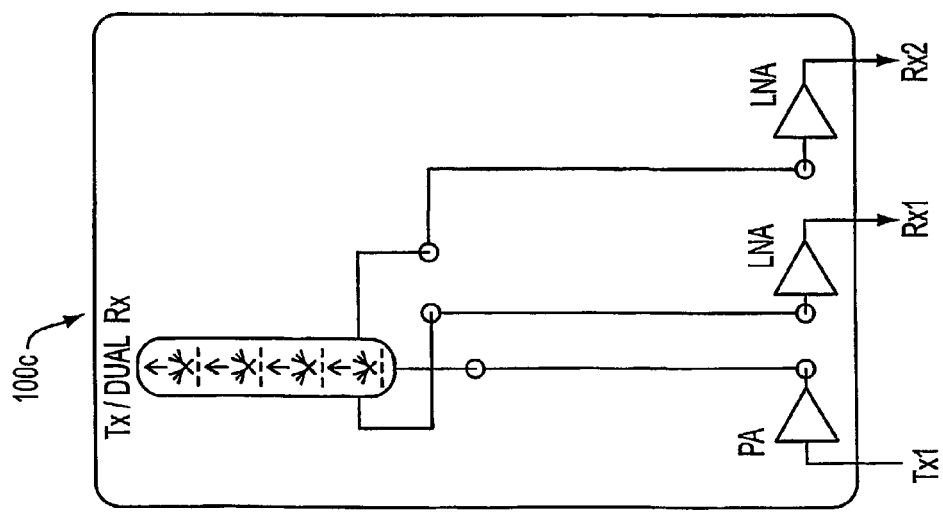
Figure 4:
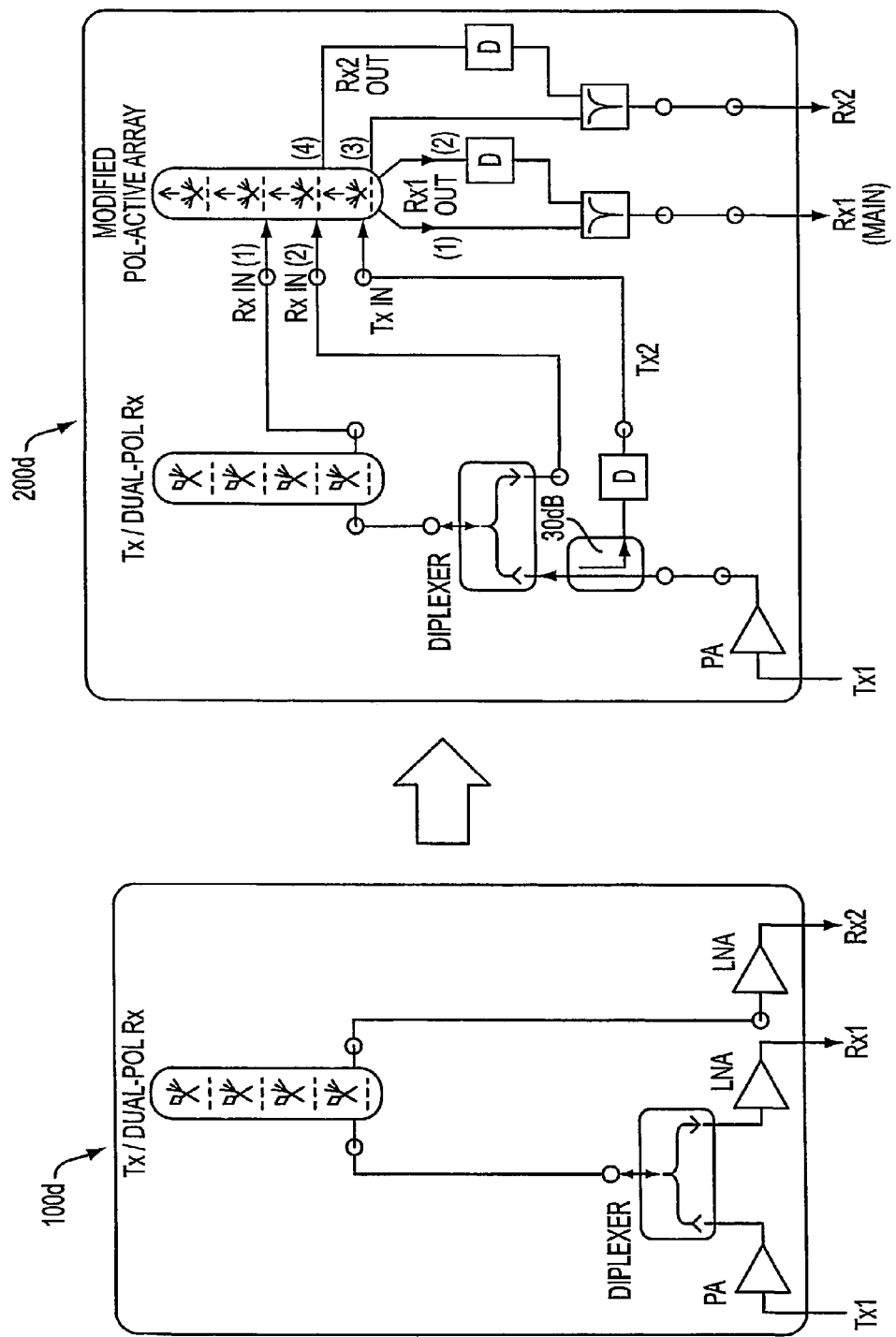
FIG. 4 illustrates the addition of Tx and Rx time diversity to an original Rx Polarization Diversity configuration having no Tx diversity and a common Tx-Rx antenna (CDMA application)
Figure 5:
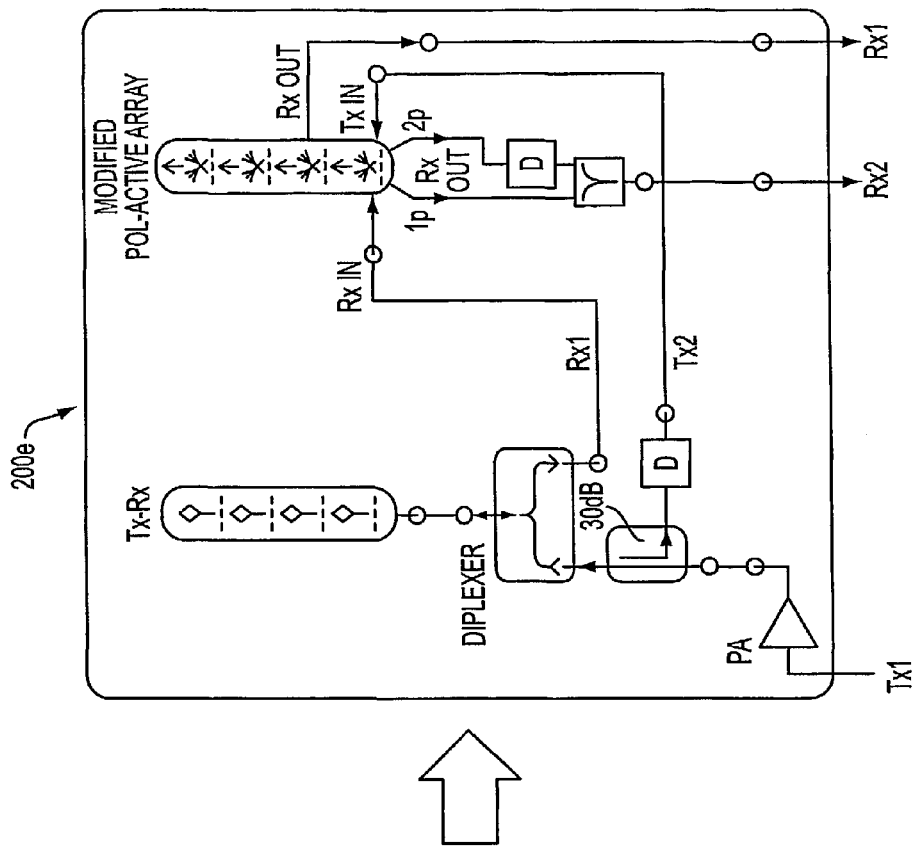
FIG. 5 illustrates the modification of an original space diversity configuration with no transmit diversity to a Receive space and polarization active array with Transmit and Receive time diversity.
Figure 5:
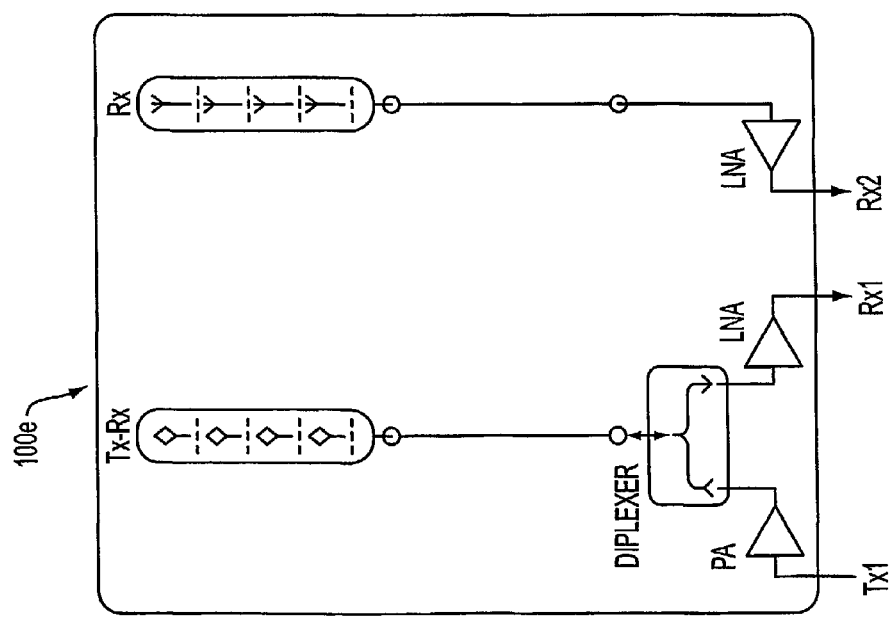

An existing base station antenna arrangement may be augmented by adding a new antenna array and/or replacing an existing antenna array with a new antenna array. FIGS. 1–7 illustrate various embodiments of such augmentations of existing base station antenna arrangements 100a–g with a new antenna array 30a–g. The new antenna array 30a–g may comprise an active antenna array, which includes an active radiator unit 5a or 5b having both receive and transmit antenna elements. By way of example, the circled portion 5a shown in FIG. 1 depicts an exemplary structure of the active radiator unit 5a that may be utilized in the active antenna arrays 30a–c of FIGS. 1–3.

FIG. 1 illustrates an augmentation method that modifies an existing base station antenna arrangement 100a, which comprises a main antenna array 10a and a secondary antenna array 12a, by replacing the secondary antenna array 12a with a new antenna array 30a, which may be active or passive. Namely, augmentation of the base station in FIG. 1 converts an existing space diversity antenna arrangement of a base station, having no transmit diversity, to an augmented antenna array 200a having receive space diversity antenna elements and transmit time diversity.

Initially, the existing base station antenna arrangement 100a includes a main antenna array 10a, having a plurality of antenna elements each of which serves as a common single antenna element 36a that permits transmission and reception over the same antenna element. A single cable 20 extends from the main antenna array 10a, which is located at the top of a building 33, and connects to a diplexer 15a, which is located below the top of the mast/building 23. The diplexer 15a serves as a coupler that allows the simultaneous transmission and reception of two signals using the common single antenna elements 36a of the main antenna array 10a To transmit a signal from the base station to a mobile unit (not shown) along the forward link, the base station transceiver subsystem (not shown) sends a transmit signal via transmission cable Tx1 through a power amplifier 85 to an input terminal of the diplexer 15a The diplexer 15a then sends the transmit signal over a cable 20 to the main antenna array 10a where the transmit signal is radiated to the mobile unit (not shown). When the mobile unit transmits a signal to the base station along the reverse link, the receive signal arrives at the common single antenna elements 36a, which then sends the receive signal to the diplexer 15a via cable 20. The diplexer 15a transmits the receive signal to the base station transceiver subsystem (not shown) by directing the signal over the receive line Rx1 and through a LNA.

In the embodiment of FIG. 1, the secondary antenna array 12a includes a space diversity antenna array, having only receive elements 37a. However, the scope of the embodiment of FIG. 1 is not limited to this exemplary arrangement. Other types of secondary antenna array arrangements may be employed alone or in combination, such as a Tx only diversity antenna array, a Rx only diversity antenna array or a Tx-Rx diversity antenna array.

Within the existing base station antenna arrangement 100a of FIG. 1, a single cable 22a extends from the secondary antenna array 12a, which is located at the top of a building 33, to a LNA 17, which is located below the top of the mast/building 23. The single cable 22a further extends from the LNA 17 in the direction of reception cable Rx2 to the receive input terminal of the base station transceiver subsystem (not shown). As shown in FIG. 1, the secondary antenna array 12a may be passive in that the antenna elements are not coupled to proximate amplifiers provided at the top of the mast/building. In fact, in FIG. 1, both the main antenna array 10a and the secondary antenna array 12a are passive. Thus, it is within the scope of the embodiment of FIG. 1 that either or both the main antenna array 10a and the secondary antenna array 12a may be passive.

In FIG. 1, in order to convert the existing base station antenna arrangement 100a to an augmented antenna array 200a, several modifications are made to the secondary antenna array 12a and to the section of the main antenna array 10a located below the top of the mast/building 23. Modifications to the secondary active antenna array 12a include replacing the secondary antenna array 12a with a new antenna array 30a, which may be either active or passive. In this embodiment of FIG. 1, the newly added antenna array 30a comprises an active antenna array, which includes an active radiator unit 5a having both receive 55 and transit 50 antenna elements, as disclosed in U.S. application Ser. No. 09/357,845, which is incorporated herein by reference thereto, in its entirety. The transmit 50 and receive 55 antenna elements connect at the masthead or at the top of the building to amplifiers 60, 70 by way of bandpass filters 65; As shown in the circled portion 5a of FIG. 1, by way of example, the transmit antenna elements 50 connects to a LPA and a bandpass filter 65, and the receive antenna element 55 connects to a LNA 70 and a bandpass filter 65. Although FIG. 1 illustrates the new antenna array as having four active radiator units 5, this embodiment is not the limited to the exemplary configuration as shown.

In order to provide additional diversity schemes to the embodiment of FIG. 1, the augmentation method also modifies the lower portion of the main antenna array 10a. In FIG. 1, comparing the existing base station antenna arrangement 100a to the augmented antenna array 200a, a modification, which occurs at the lower portion of the main antenna array 10a, relocates the diplexer 15a from its original position, below the top of the mast/building 23 to a relocated position at the top of the building 33. The connection, from the base station transceiver subsystem (not shown) to the relocated diplexer 15b via transmission cable Tx1, changes to include a directional coupler 40 added between the power amplifier 85 and the relocated diplexer 15b. The directional coupler 40 serves as a directive feed that couples the main antenna 10a and new antenna array 30a. As the base station transceiver subsystem (not shown) transmits a signal via the transmission cable Tx1 to the transmit elements of the common single antenna element 36a of the main antenna array 10a, the directional coupler 40 obtains a sample of the transmit signal before the main antenna array 10a radiates the signal along the forward link to a mobile unit (not shown). The directional coupler 40 then sends the sample of the transit signal to a delay unit 35 by way of cable Tx2. The delay unit 35 facilitates transmit time diversity within the augmented antenna array 200a by sending, at least one or more time-delayed copies of the sample of the signal to the transmit elements 50 of the new antenna array 30a, at connection point Tx in, for broadcasting the copy signal to mobile units.

Any passive element of the main antenna array 10a may also be rendered active by connecting the output terminal of the relocated diplexer 15b to a new antenna array 30a, which is active. The connection between the output terminal of the diplexer 15a and the base station, also changes during the augmentation process. Instead of traveling directly to the base station as shown in the existing base station antenna arrangement 100a, in the augmented antenna array 200a, the receive signal now travels from the relocated diplexer 15b to the receive elements 55 of the new antenna array 30 via reception cable Rx1 and enters the new antenna array 30a at connection point Rx in. Then, all signals received at the new antenna array 30 exit the new antenna array 30 and travel to the base station transceiver subsystem (not shown) via reception cables Rx1 and Rx2.

Augmentation of the existing base station antenna arrangement 100a provides several benefits to the augmented antenna array 200a of FIG. 1. For example, the augmentation may be implemented within the same dimensions as the existing base station antenna arrangement 100a. In other words, the space required to implement the augmentations encompasses approximately the same amount of space as the existing base station antenna arrangement 100a Thus, implementation of the augmented antenna array does not require any additional space. This is an important benefit because it adds antenna functionality within an existing base station without adding antenna arrays that may take up additional space or be considered as additional antenna arrangements, which may be a violation of local laws, regulations or ordinances.

Another benefit gained from augmenting the existing base station is the ability to provide a relatively effortless method of incorporating multiple types of diversity schemes. For example, in the augmented antenna array 200a of FIG. 1, the configuration includes at least two types of diversity—space diversity and transmit time diversity. The spacing between the main antenna 10a and the new antenna array 30a creates space diversity. Meanwhile, the directional coupler 40 and delay unit 35 helps to facilitate time transmit diversity, as discussed above. By augmenting the base station to include transmit diversity, the need for space diversity in the mobile unit becomes unnecessary, and, as a result, miniaturization of the mobile unit can be realized.

In FIG. 1, a further benefit derived from the augmentation of the base station includes cost reductions, which inherently flow from rendering the passive receive diversity antenna array 12a and any passive elements of the main antenna array 10a of the existing base station antenna arrangement 100a to be active antenna arrays. This is achieved by installing amplifiers 60, 70 and bandpass filters 65 at the top of the mast of the building, rather than only at the bottom of the mast or the building. By rendering the passive antenna array to be active, this augmentation decreases the power consumption cost and cabling cost.

The embodiments illustrated in FIGS. 2–5 have been described in full detail in the co-pending U.S. patent application Ser. No. 09/697,770, for Cellular Base Station Augmentation filed on Oct. 27, 2000, which is hereby expressly incorporated herein by reference, in its entirety. Accordingly, a detailed description of those embodiments will not be repeated here.

Figure 6:
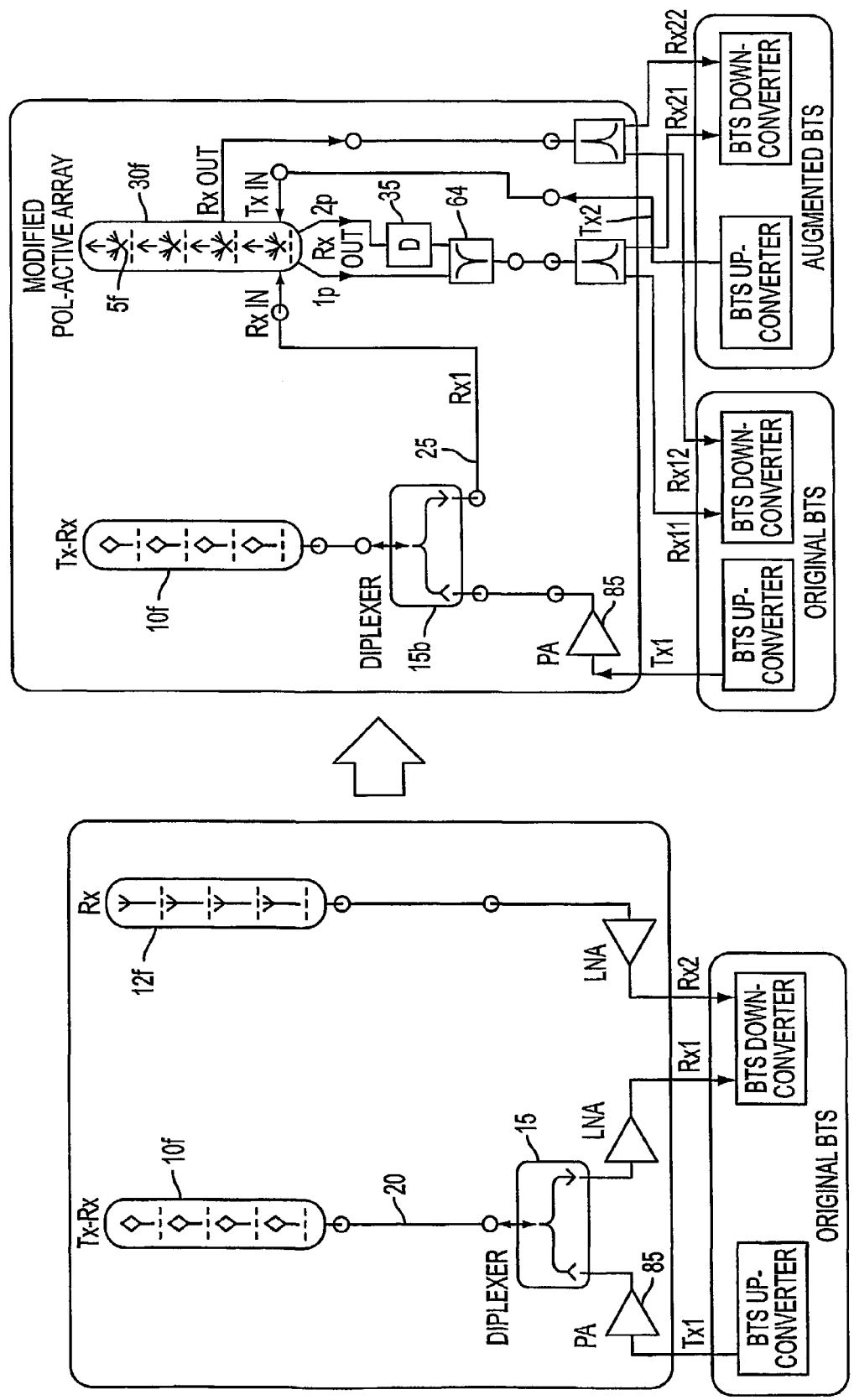
FIG. 6 illustrates the augmentation of a BTS plus active array diversity antenna providing Rx space and polarization active array plus Rx time diversity.
Figure 7:
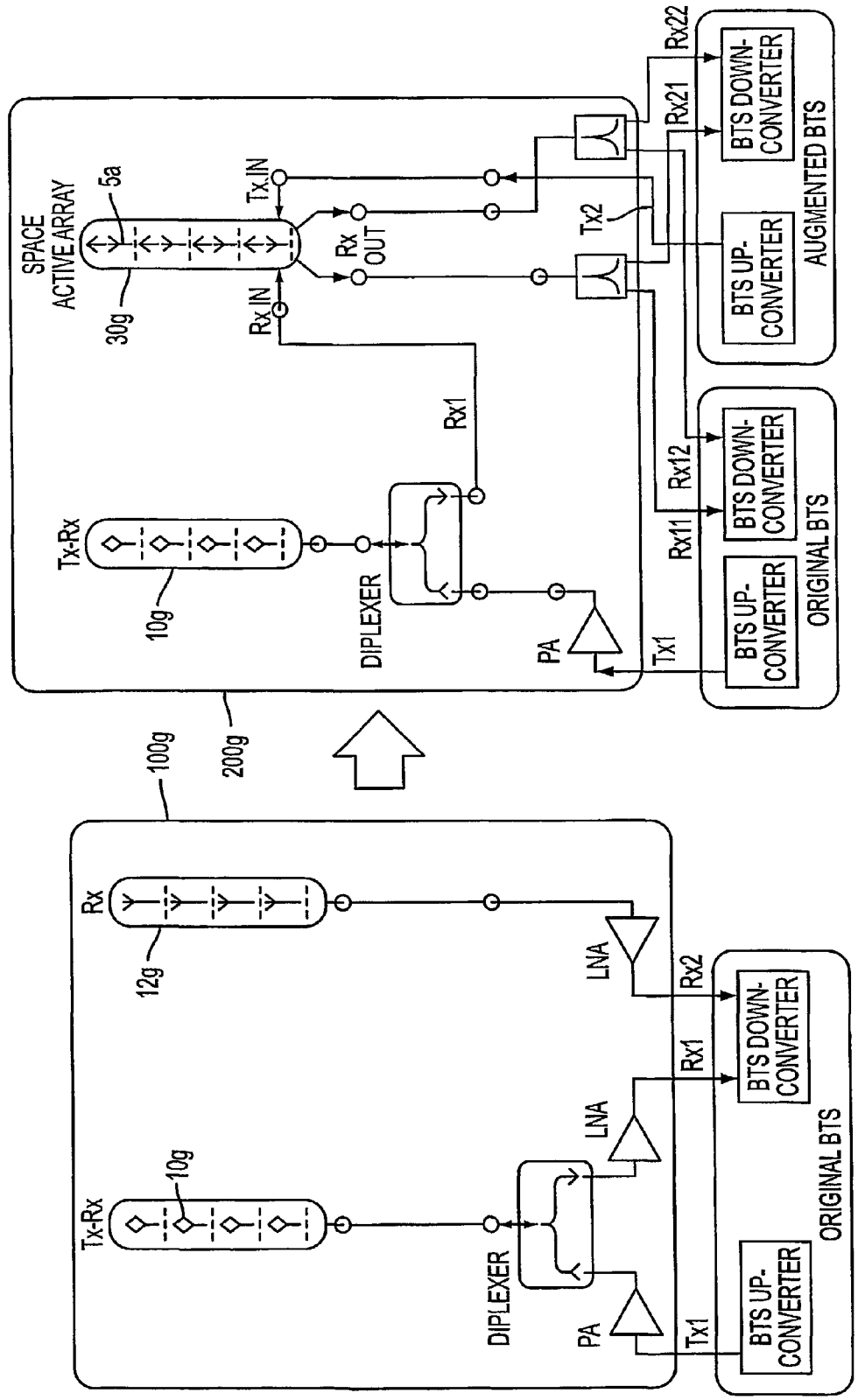
FIG. 7 illustrates the augmentation of a BTS plus active array diversity antenna providing Rx space-active.

The embodiments of FIGS. 6 and 7 illustrate how the antenna augmentation approach of FIGS. 1–5 can be integrated with a base station. In FIG. 6, the new antenna array 30f adds polarization diversity via active element 5f. The augmentation illustrated in FIG. 6 also includes Rx time diversity. Although the base station is illustrated with respect to FIGS. 6 and 7, it should be understood that the base station as illustrated in FIGS. 6 and 7 can be employed with other embodiments, including other embodiments described herein.

To implement Rx time diversity, a combiner 64 and a delay unit 35 are provided in the path of received signals, downstream of the main antenna array 10f and the new antenna array 30f. When a mobile unit transmits a signal to the base station transceiver subsystem (not shown), the receive elements of the main antenna array 10f and the new antenna array 30f intercept the receive signals and send the receive signals to the base along the respective reception path of the main antenna array 10f and the new antenna array 30f. The travel path of the cable Rx1 extends from the main antenna array 10f, travels through relocated diplexer 15b and feeds into the new antenna array 30f at connection point Rx In. Once the receive signals enter the new antenna array 30f, the signals may exit through several different routes, e.g., Rx Out (1p) and (2p) and Rx Out. The delay unit 35, within the travel path of the reception lines, collects the receive signals of Rx(1p) and (2p) to perform a diversity analysis on the characteristics of the receive signals. The combiner 64, located within the reception cable Rx2, can combine the receive signals and can transmit the receive signals to the base station transceiver subsystem 400. Alternatively, or in conjunction with the reception cables lines of reception cable Rx2, the receive signals may travel from the new antenna array 30e to the base station transceiver subsystem 400 via reception cable Rx1.

FIG. 7 illustrates an embodiment of the present invention in which the secondary antenna array 12g of the existing base station arrangement 100g has been replaced by an array 30g having active radiator units 5a. The augmented arrangement 200g provides Rx space diversity with the active secondary array 30g.

The embodiments illustrated in FIGS. 1–5 use time diversity in their augmented antenna arrays 200a–e by the inclusion of a directional coupler 40 and delay unit 35 in the signal path However, time diversity schemes cannot be used in TDMA systems, since TDMA systems are based on fixed and predetermined time slotted transmissions. Thus, transmitting a delayed replica of the same signal will create interference in an adjacent time slot for these systems. The adjacent time slot is allocated to another user, and therefore undesirable interference would likely occur.

Since it is inefficient and sometimes not practical to require the mobile user terminal to employ space diversity on the forward link, the forward link for a TDMA system suffers from excessive link budget loss, compared with the reverse link. This loss is usually compensated by using higher transmitter power for the forward link, and thus translates to higher cost and a more complex power amplifier unit.

Figure 8:
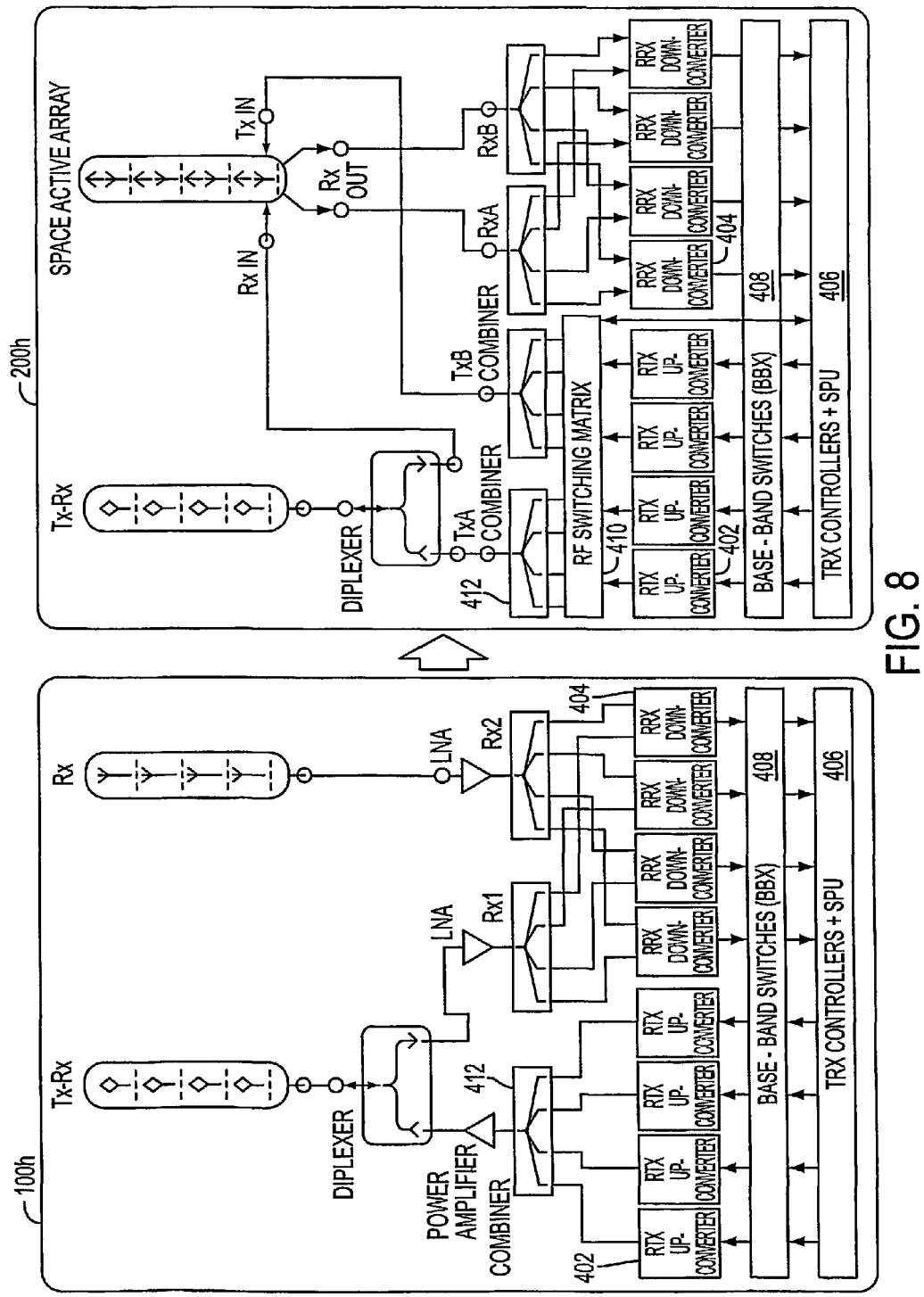
FIG. 8 illustrates the application of TDMA Tx switching for a space diversity Rx system.

FIG. 8 depicts a further aspect of the present invention. The original configuration 100h of the BTS 400 and antenna array 30a in FIG. 8 illustrates a typical TDMA configuration in the GSM case. The secondary antenna array 12h of the original configuration 100h provides passive Rx diversity.

In the augmented case 200h of FIG. 8, each RTx up-converter board 402 processes up to eight calls, which correspond to eight time slots. On the reverse link, the RRx down converter unit 404 provides dual diversity reception at Rx frequencies, which have a fixed offset from the Tx frequencies. The up and down converters 402, 404 connect to the transmission control units (TXRCs) 406, which contain the TRx controllers and Signal Processing Units (SPU). The base-band switch unit 408 between the RTx 402 and the RRx 404 units to the SPU 406 is an optional unit that is used for frequency hopping.

In FIG. 8, an RF switch 410 is used between the up converter 402 and the power transmit combiners 412, such that each up converter output will be routed alternatively between two antennas, with a minimum average rate of a TDMA time frame (4.615 ms for GSM, 20 mSec for IS-136). Since the channel fading statistics vary more slowly than the switching rate, the proposed scheme will improve the forward link channel link budget. The extent of this improvement is dependent on the mobile speed and the nature of the propagation environment, though it will not be as efficient as classical Rx space diversity, in which the signal is present on both antennas concurrently. Thus, more sophisticated schemes such as diversity combining can be deployed.

Figure 9:
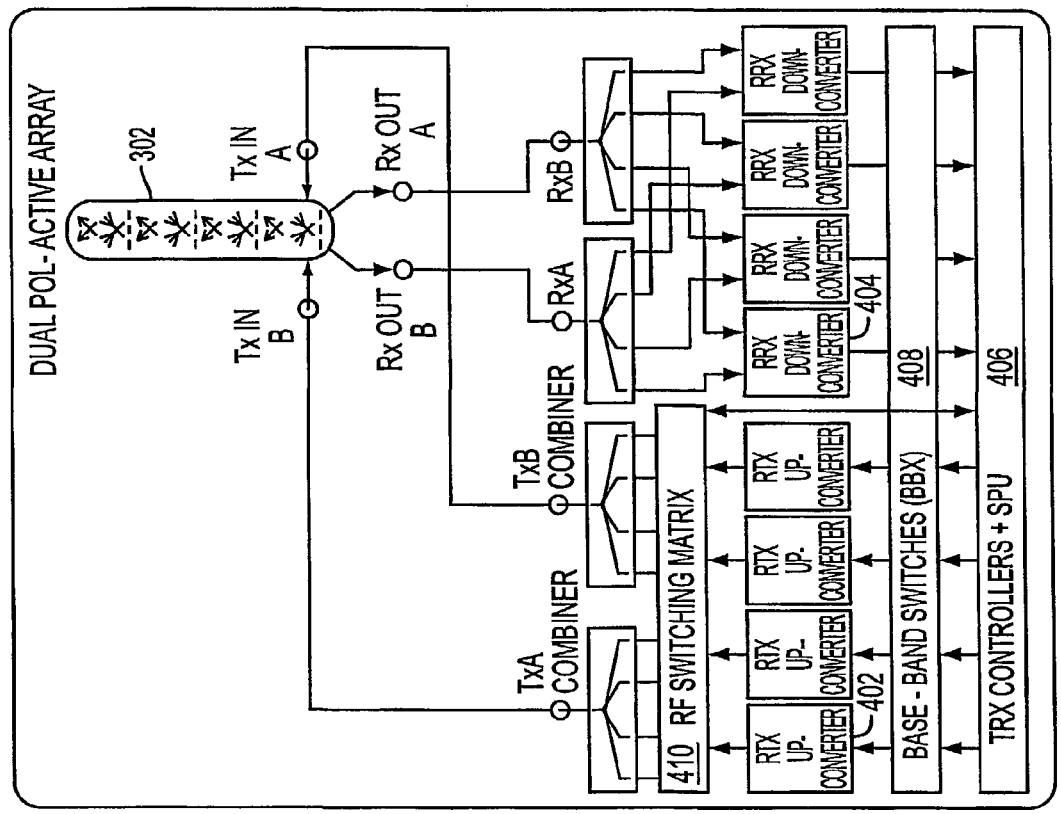
FIG. 9 illustrates the application of TDMA Tx switching for a polarization diversity Rx system.

FIG. 9 depicts another embodiment of the switched time transmit space diversity. In this embodiment, a single active antenna array 302 is present, employing polarization diversity instead of space diversity. This scheme uses the RF switch 410 to toggle between two polarization (+/−45° slant polarization) directions, providing the same forward link benefit as the embodiment of FIG. 8. The placement and control of the RF switch 410 are the same as those in the embodiment of FIG. 8. A polarization matching algorithim can be used to improve the performance of the Tx channels.

Figure 10:
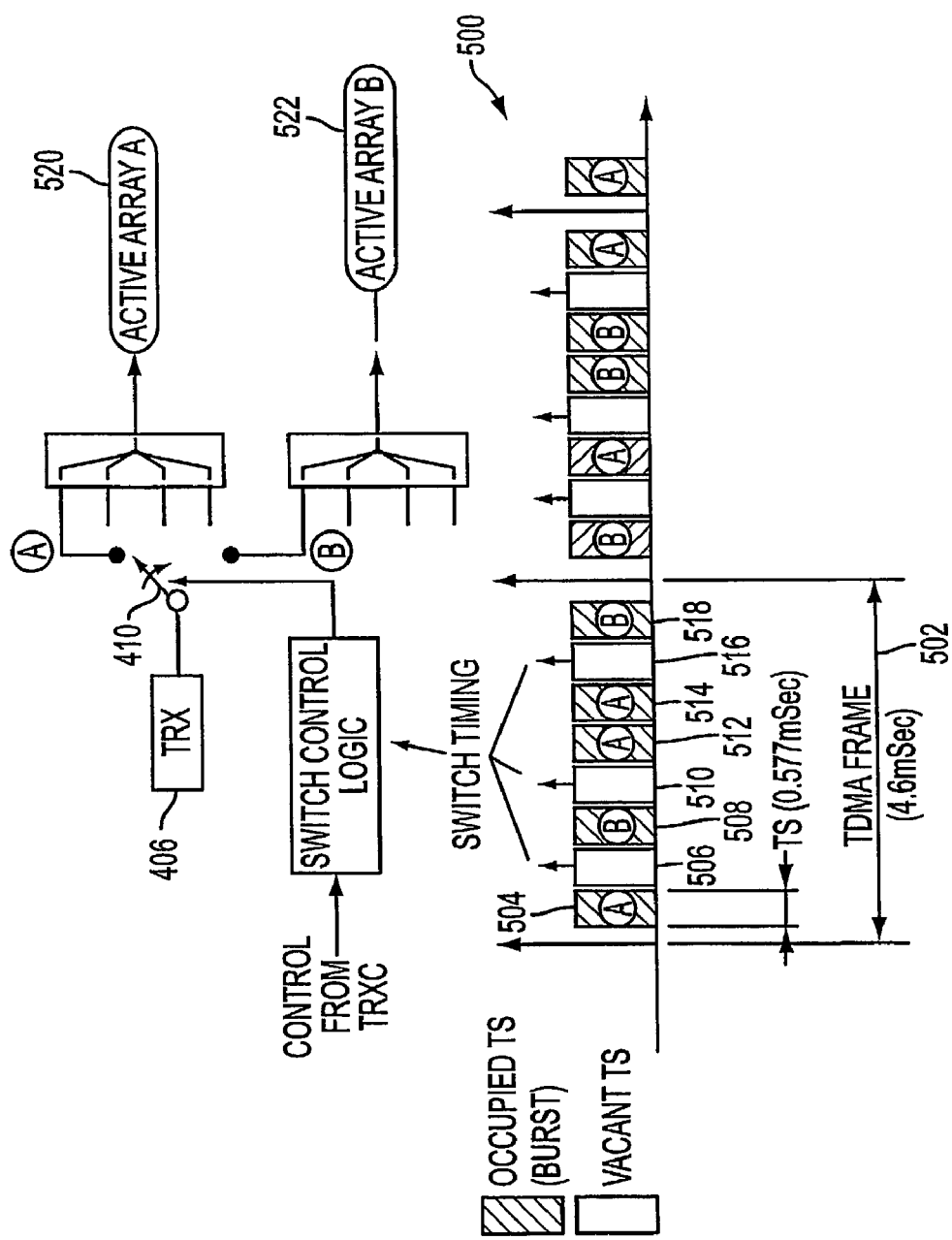
FIG. 10 illustrates the required timing for TDMA Tx switching.

Referring particularly to the embodiments of FIGS. 8–10, a channel card can be switched between two antennas or sets of Tx elements according to logic rules such as, for example, the following rules:

(1) The total number of channel cards served by the antenna or set of transmit elements is less than the maximum number of frequencies that can be served by a single power amplifier.

(2) The frequency separation between the carriers (carriers allocated to each channel card) directed to one Tx antenna or set of transmit elements in a given time period or time slot is less than the maximum frequency separation specified for the power amplifier.

(3) On average, the total power from each antenna or set of transmit elements will be balanced.

(4) The switching will take place on an available time slot within the time frame. It is assumed that the BTS is not congested, and at least one time slot is free. Note that this requirement is necessary for the operation of this transmit diversity scheme, but is not required for the normal operation of the BTS forward link. However, GOS requirements and proper system design will guarantee that most of the time at least one time slot will be available for the switching process.

The operation of the switching mechanism is illustrated in FIG. 10. A TDMA data stream in the GSM case shown at 500. For the purpose of this example, one TDMA frame 502 is considered, although the principles discussed here extend to an entire TDMA data stream, whether in the GSM or IS-136 case. In this case, the TDMA frame 502 of 4.6 milliseconds is divided into eight time slots 504–518, each with a duration of 0.577 milliseconds. Time slots 504, 512 and 514 are occupied as part of a first conversation A. Time slots 508 and 518 are occupied as part of a second conversation B. Time slots 506, 510 and 516 are unoccupied.

To achieve the forward link benefit of the present invention, the transmission of the occupied time slots 504, 508, 512, 514 and 518 is to be switched between a first active array of transmit elements 520 and a second active array of transmit elements 522. The active arrays 520, 522 may be the active arrays illustrated in the embodiments of FIGS. 1–9, or they may be any other active arrays encompassed within the scope of the present invention. Switching is performed in accordance with the procedures outlined above. In particular, the switching operation must be completed during the unoccupied time slots 506, 510 and 516.

The switching process begins when the transmission controller 406 provides information about available time slots to the switching logic controller. The information from the transmission controller 406 is processed by the switching logic controller according to the rules presented above, and the switch 410 is actuated appropriately to transmit the information in the time slot.

Various details concerning the antenna, assemblies, elements and arrays used in the embodiments disclosed herein (and other details pertinent to features and components disclosed herein), are described in commonly-assigned, co-pending U.S. patent application Ser. Nos. 09/357,844 filed Jul. 21, 1999, Ser. No. 09/357,845 filed Jul. 21, 1999, and 60/161,918 filed Oct. 28, 1999. The content of each of these co-pending applications is hereby incorporated herein by reference herein in its entirety.

Further, while the invention has been described by way of exemplary embodiments, it is understood that the words that have been used herein are words of description, rather than words of limitation. Changes may be made, within the purview of the appended claims, without departing from the scope and the spirit of the invention in its broader aspects. Although the invention has been described herein with reference to particular structures, materials, and embodiments, it is understood that the invention is not limited to the particulars disclosed. Those skilled in the art with access to the teachings provided herein will recognize additional modifications, applications, and embodiments within the scope thereof and additional fields in which the present invention would be of significant utility.

What is claimed is:

1. A method for augmenting an existing base station for transmitting a signal using transmit diversity, the existing base station including a main antenna array and a diversity antenna array located externally to the base station, the method comprising:
    replacing the diversity antenna array with a new active diversity antenna array comprising both receive and transmit elements
    installing a directional coupler and a time delay unit in the signal path between the base station and the transmit elements of the new active diversity antenna array, externally to the base station to produce a delayed replica of the signal at the new active diversity antenna; thereby to allow transmitting of the delayed replica of the signal through the new active diversity antenna.

2. A method for augmenting an existing base station according to claim 1, wherein the main antenna array and the new diversity antenna array are co-located to form one common array.

3. A method for augmenting an existing base station according to claim 1, wherein the receive and transmit elements of the new diversity antenna array are active, each antenna element being associated with an amplifier and a bandpass filter, located at the top of a building.

4. A method for augmenting an existing base station according to claim 3, wherein the amplifier associated with the transmit elements of the new diversity antenna is a linearized power amplifier; and
    wherein the amplifier associated with the receive elements of the new diversity antenna is a low noise amplifier.

5. A method for augmenting an existing base station according to claim 1, wherein the main antenna receive elements comprise a receiver antenna array.

6. A method for augmenting an existing base station according to claim 1, wherein the main antenna transmit elements comprise a transmitter antenna array.

7. A method for augmenting an existing base station according to claim 1, wherein the main antenna comprises both a receiver and transmitter antenna arrays.

8. A method for augmenting an existing base station according to claim 1, wherein the receive elements of the diversity antenna comprise a passive antenna.

9. A method for augmenting an existing base station according to claim 8, wherein the diversity antenna comprises only a receiver antenna array.

10. A method for augmenting an existing base station according to claim 1, wherein said receive elements of said diversity antenna comprise a receiver antenna array.

11. A method for augmenting an existing base station according to claim 1, wherein the replacing the diversity antenna array with a new diversity antenna array adds space diversity to the base station.

12. A method for augmenting an existing base station according to claim 1, wherein the replacing the diversity antenna array with a new diversity antenna array adds multiple diversity schemes to a forward link of the base station.

13. A method for augmenting an existing base station according to claim 12, wherein the multiple diversity schemes include space diversity and polarization diversity.

14. A method for augmenting an existing base station according to claim 13,
    wherein the space diversity is generated due to the spacing between the main antenna array and the new diversity antenna array; and
    wherein the polarization diversity is generated among the members of a set of the receive antenna elements of the new diversity antenna array.

* * * * *